United States Patent
Hirano

(10) Patent No.: US 8,136,867 B2
(45) Date of Patent: Mar. 20, 2012

(54) AERODYNAMIC STRUCTURE FOR VEHICLE

(75) Inventor: Munehiro Hirano, Aichi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/677,361

(22) PCT Filed: Aug. 18, 2008

(86) PCT No.: PCT/JP2008/064687
§ 371 (c)(1),
(2), (4) Date: Mar. 10, 2010

(87) PCT Pub. No.: WO2009/034813
PCT Pub. Date: Mar. 19, 2009

(65) Prior Publication Data
US 2011/0001334 A1  Jan. 6, 2011

(30) Foreign Application Priority Data
Sep. 11, 2007 (JP) ................. 2007-235931

(51) Int. Cl.
*B60J 7/00* (2006.01)
(52) U.S. Cl. ...................... 296/180.1; 296/98
(58) Field of Classification Search ............. 296/180.1, 296/198
See application file for complete search history.

(56) References Cited

U.S. PATENT DOCUMENTS

| 1,817,705 A | 8/1931 | Outterside |
| 4,334,694 A * | 6/1982 | Iwanicki ................ 280/851 |
| 2003/0098576 A1 | 5/2003 | Brulhart |

FOREIGN PATENT DOCUMENTS

| GB | 2 265 875 A | 10/1993 |
| JP | 8-216929 | 8/1996 |
| JP | 2003-528772 | 9/2003 |
| WO | WO 90/02073 | 3/1990 |

OTHER PUBLICATIONS

K. Sumitani et al., U.S. Appl. No. 12/293,659, filed Sep. 19, 2008.
Extended European Search Report for EP Appl. No. 08831070.1-1268 dated Mar. 8, 2011.

* cited by examiner

*Primary Examiner* — Joseph Pape
(74) *Attorney, Agent, or Firm* — Finnegan, Henderson, Farabow, Garrett & Dunner, LLP

(57) ABSTRACT

An aerodynamic structure for a vehicle that can effectively adjust airflow within a wheel house is provided. An aerodynamic structure for a vehicle has an airflow collision wall provided at a rear in a vehicle body longitudinal direction with respect to a front wheel in a wheel house, and extending in a vehicle width direction and facing a lower side in a vehicle body vertical direction, an airflow guiding wall extending downward in the vehicle body vertical direction from an end portion of the airflow collision wall which end portion is at a side that is far from the front wheel, and a step portion formed at a portion in the vehicle width direction of at least one of the airflow guiding wall and the airflow collision wall, and including inward-facing walls that extend along a direction intersecting the vehicle width direction.

11 Claims, 14 Drawing Sheets

AERODYNAMIC STRUCTURE FOR VEHICLE

CROSS-REFERENCE TO RELATED APPLICATIONS

This application is a national phase application of International Application No. PCT/JP2008/064687, filed Aug. 18, 2008, and claims the priority of Japanese Application No. 2007-235931, filed Sept. 11, 2007, the contents of both of which are incorporated herein by reference.

TECHNICAL FIELD

The present invention relates to an aerodynamic structure for a vehicle for adjusting airflow within a wheel house.

BACKGROUND TECHNOLOGY

There is known an aerodynamic stabilizer that is structured by fixing a baffle to the front side or the vehicle width direction inner side of a wheel within a wheel house of an automobile (see, for example, Japanese National Publication No. 2003-528772). Further, the technology disclosed in the specification of British Patent Application Publication No. 2265785 is known.

DISCLOSURE OF THE INVENTION

Problems to be Solved by the Invention

However, in the conventional technique as described above, because the baffle projects-out from the wheel house, there are various limitations such as avoiding interference with the wheel and the like, and it is difficult to obtain a sufficient airflow adjusting effect.

In view of the above-described circumstances, an object of the present invention is to provide an aerodynamic structure for a vehicle that can effectively adjust airflow within a wheel house.

Means for Solving the Problems

An aerodynamic structure for a vehicle relating to a first aspect of the present invention comprises: an airflow collision wall provided at a front or a rear in a vehicle body longitudinal direction with respect to a wheel in a wheel house, and extending in a vehicle width direction and facing a lower side in a vehicle body vertical direction; an airflow guiding wall extending downward in the vehicle body vertical direction from an end portion of the airflow collision wall which end portion is at a side that is far from the wheel; and a cross-sectional shape sudden change portion formed at a portion in the vehicle width direction of at least one of the airflow collision wall and the airflow guiding wall, and including a portion that extends along a direction intersecting the vehicle width direction.

In accordance with this aspect, accompanying traveling, airflow hits the front surface of the wheel, and airflow directed toward the rear (the upstream side in the wheel rotating direction) arises within the wheel house. Further, accompanying traveling of the vehicle (rotation of the wheel), airflow, that is dragged-in by rotation of the wheel and is directed toward the front (the downstream side in the wheel rotating direction) arises within the wheel house.

In a structure in which the airflow collision wall is provided further toward the rear side in the vehicle body longitudinal direction than the rotational center of the wheel, a portion of the airflow that is directed toward the front within the wheel house is guided by the airflow guiding wall and collides with the airflow collision wall. Due thereto, pressure rises around a concave (groove) portion that is formed by the airflow collision wall and the airflow guiding wall, and flowing-in of air to the wheel house is suppressed. Further, because the airflow collision wall is positioned further rearward than the rotational center of the wheel, flowing-in of air to the wheel house accompanying rotation of the wheel is suppressed at the upstream (entrance) side, and discharging of air, that has flowed-into the wheel house, from the side is suppressed.

On the other hand, in a structure in which the airflow collision wall is provided further toward the front side in the vehicle body longitudinal direction than the rotational center of the wheel, the airflow that is directed toward the rear within the wheel house is guided by the airflow guiding wall and is blocked by the airflow collision wall, and the flowing of airflow toward the rear within the wheel house is suppressed. Due thereto, interference of the airflow, that is directed toward the rear within the wheel house, and the airflow, that is directed toward the front, is suppressed, and these flows are smoothly discharged to the side of the wheel. Namely, the airflow around the wheel is adjusted.

In this way, in the present aerodynamic structure for a vehicle, airflow can be effectively adjusted within a wheel house.

By the way, in the present aerodynamic structure for a vehicle, even in a structure in which the airflow collision wall is provided at either the front or rear in the vehicle body longitudinal direction with respect to the wheel, the airflow guiding wall is positioned away from the wheel. Therefore, in cases in which snow or ice adheres to the wheel house inner surface side, there are cases in which the thickness of these adhered matter becomes thick.

Here, in the present aerodynamic structure for a vehicle, because the cross-sectional shape sudden change portion is formed at at least one of the airflow collision wall and the airflow guiding wall, a fragile portion (stress concentration portion) is formed at the adhered matter such as snow or ice or the like that has adhered to the wheel house inner surface side. Therefore, the adhered matter, such as the snow or ice or the like that has adhered to the wheel house inner surface side, is easily destroyed (divided in plural), and the ability to discharge this adhered matter from the wheel house improves.

In the aerodynamic structure for a vehicle of the above-described aspect, the cross-sectional shape sudden change portion is formed at a central portion in the vehicle width direction of at least one of the airflow collision wall and the airflow guiding wall.

In accordance with this aspect, because the cross-sectional shape sudden change portion is disposed at the substantially central portion in the vehicle width direction, the adhered matter, such as snow or ice or the like that has been destroyed at the fragile portion that is formed so as to follow the cross-sectional shape sudden change portion, is easily removed from the wheel house.

In the aerodynamic structure for a vehicle of the above-described aspect, the cross-sectional shape sudden change portion is structured to include a step portion that is formed at least one of the airflow collision wall and the airflow guiding wall and at which positions, in the vehicle body longitudinal direction or the vehicle body vertical direction, of one end side and another end side in the vehicle width direction are different.

In accordance with this aspect, a step is formed, as the fragile portion in the adhered matter such as snow or ice or the like, so as to follow the cross-sectional shape sudden change portion. Therefore, the adhered matter such as snow or ice or the like is easily destroyed.

In the aerodynamic structure for a vehicle of the above-described aspect, the cross-sectional shape sudden change portion is structured to include a convex portion that is formed at least one of the airflow collision wall and the airflow guiding wall and that projects toward the wheel side.

In accordance with this aspect, a concave portion is formed, as the fragile portion in the adhered matter such as snow or ice or the like, so as to follow the cross-sectional shape sudden change portion. Therefore, the adhered matter such as snow or ice or the like is easily destroyed.

Effects of the Invention

As described above, the aerodynamic structure for a vehicle relating to the present invention has the excellent effect of being able to effectively adjust airflow within a wheel house.

PREFERRED FORMS FOR EMBODYING THE INVENTION

An aerodynamic structure 10 for a vehicle relating to a first embodiment of the present invention will be described on the basis of FIG. 1 through FIG. 7. Note that arrow FR, arrow UP, arrow IN and arrow OUT that are written appropriately in the respective drawings respectively indicate the forward direction (direction of advancing), the upward direction, the vehicle width direction inner side and the outer side of an automobile S to which the aerodynamic structure 10 for a vehicle is applied. Hereinafter, when merely the top, bottom, front, back and the inner and outer sides in the vehicle width direction are indicated, they correspond to the directions of the aforementioned respective arrows. Further, in this embodiment, the aerodynamic structure 10 for a vehicle is applied respectively to left and right front wheels 15, rear wheels 16 that serve as wheels, but because the respective aerodynamic structures 10 for a vehicle are basically structured similarly (symmetrically in the case of the left and the right), hereinafter, mainly one of the left and right aerodynamic structures 10 for a vehicle for the front wheels will be described.

Figure 2:
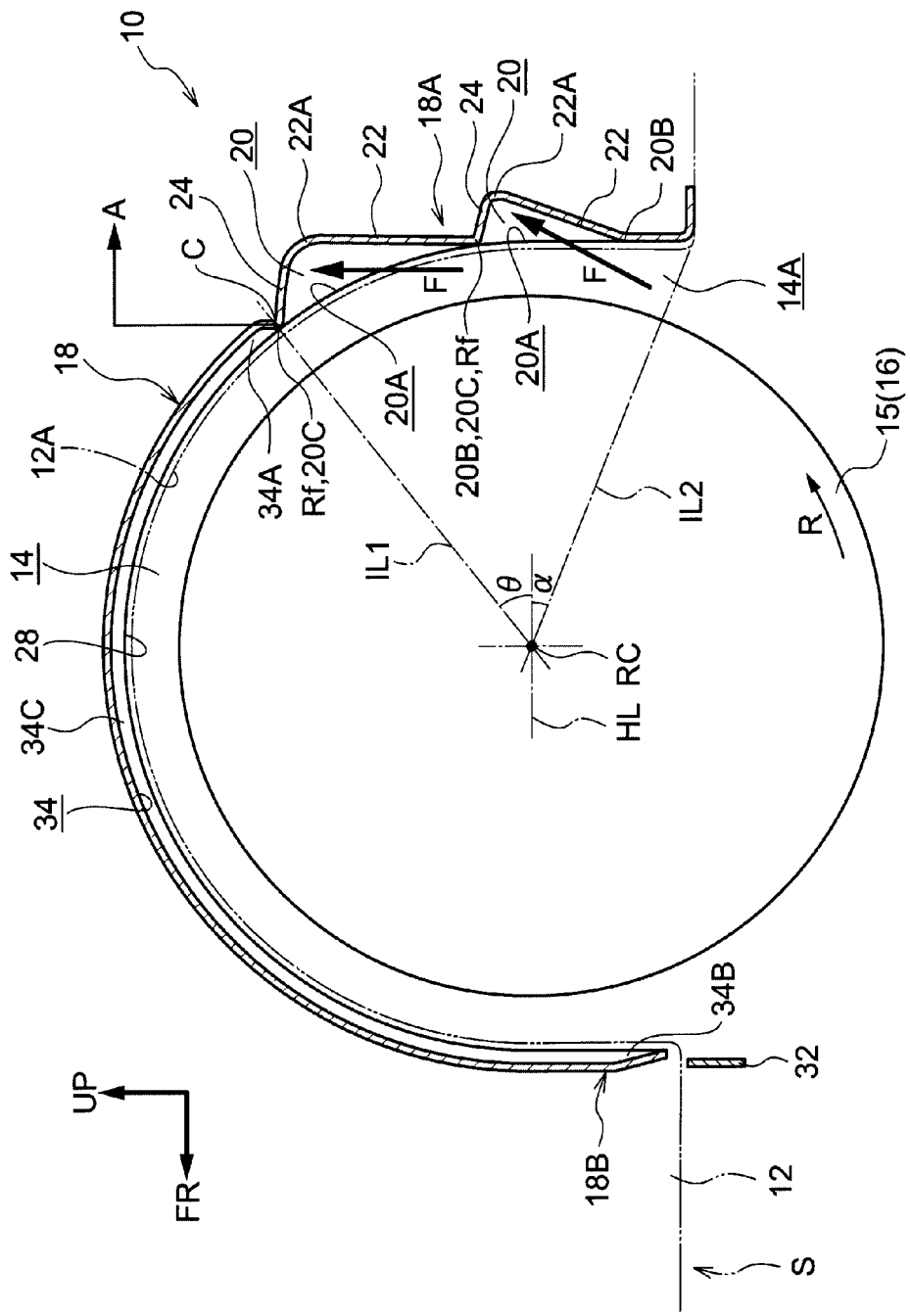
FIG. 2 is a side sectional view schematically showing the schematic overall structure of the aerodynamic structure for a vehicle relating to the first embodiment of the present invention.
Figure 3:
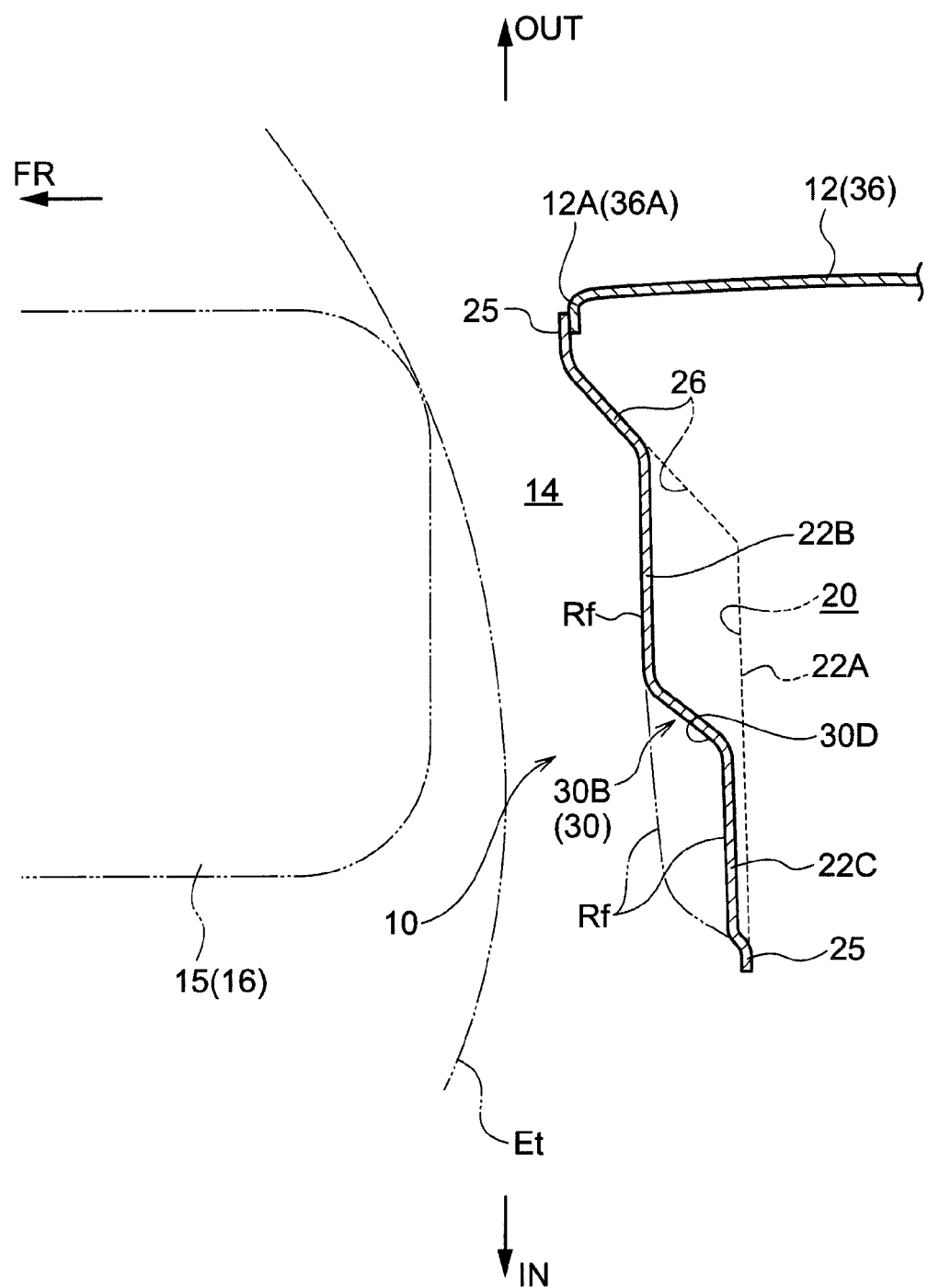
FIG. 3 is a plan sectional view schematically showing the schematic overall structure of the aerodynamic structure for a vehicle relating to the first embodiment of the present invention.

A front portion of the automobile S to which the aerodynamic structure 10 for a vehicle is applied is shown in FIG. 2 in a schematic side sectional view seen from a vehicle width direction inner side. Further, the front portion of the automobile S is shown in FIG. 3 in a schematic plan sectional view. As shown in these drawings, the automobile S has a front fender panel 12 that structures the vehicle body thereof. A wheel arch 12A, that is formed in the shape of a substantially semicircular arc that opens downward in side view for allowing steering of the front wheel 15, is formed in the front fender panel 12. Although not illustrated, a fender apron is joined to the inner side of the front fender panel 12, and a wheel house inner is provided at the fender apron. Due thereto, a wheel house 14, that is disposed such that the front wheel 15 can steer, is formed at the front portion of the automobile S.

Further, a fender liner 18, that, in side view is formed in a substantially circular arc shape that corresponds to the wheel arch 12A and has a slightly larger diameter than the wheel arch 12A and that, in plan view, is formed in a substantially rectangular shape that covers and hides the front wheel 15, is disposed at the inner side of the wheel house 14. Accordingly, the fender liner 18 is accommodated within the wheel house 14 so as to not be exposed from the wheel arch 12A in side view. The fender liner 18 covers the substantially upper half portion of the front wheel 15 from the front, above and the rear, and prevents mud, small stones, and the like from hitting the fender apron (the wheel house inner) and the like. The fender liner 18 is made of a resin formed by, for example, resin molding (injection molding or vacuum molding), or is a structure in which a nonwoven fabric is used as the substrate or as the surface material.

Further, the fender liner 18 structuring the aerodynamic structure 10 for a vehicle has concave portions (groove portions) 20 that open to the front wheel 15 side as seen in side view. In this embodiment, the concave portions 20 are provided at a portion of the fender liner 18 which portion is positioned at the rear side of the front wheel 15 (a portion that overlaps the front wheel 15 in the vehicle body vertical direction). More specifically, as shown in FIG. 2, the concave portions 20 are provided over a portion or the entirety within region A that is further rearward and downward than portion C that an imaginary straight line IL1, that forms an angle θ ($-\alpha° < \theta < 90°$) with a horizontal line HL that passes through a rotation axis RC of the front wheel 15, intersects among the portion of the fender liner 18 that is further rearward than the rotation axis RC of the front wheel 15.

At the upper limit side of the range of setting the concave portions 20, it is preferable to make the angle θ be less than or equal to 50° and more preferable to make the angle θ less than or equal to 40°, and in this embodiment, the angle θ is around 30°. Further, an angle α, that prescribes the lower limit side of the range of setting the concave portions 20, is an angle formed by an imaginary straight line IL2, that connects the rear lower end portion of the wheel house 14 from the rotation axis RC of the front wheel 15, and the horizontal line HL. The rear lower end portion of the wheel house 14 can be made to be, for example, the rear lower end of the fender liner 18.

Figure 1:
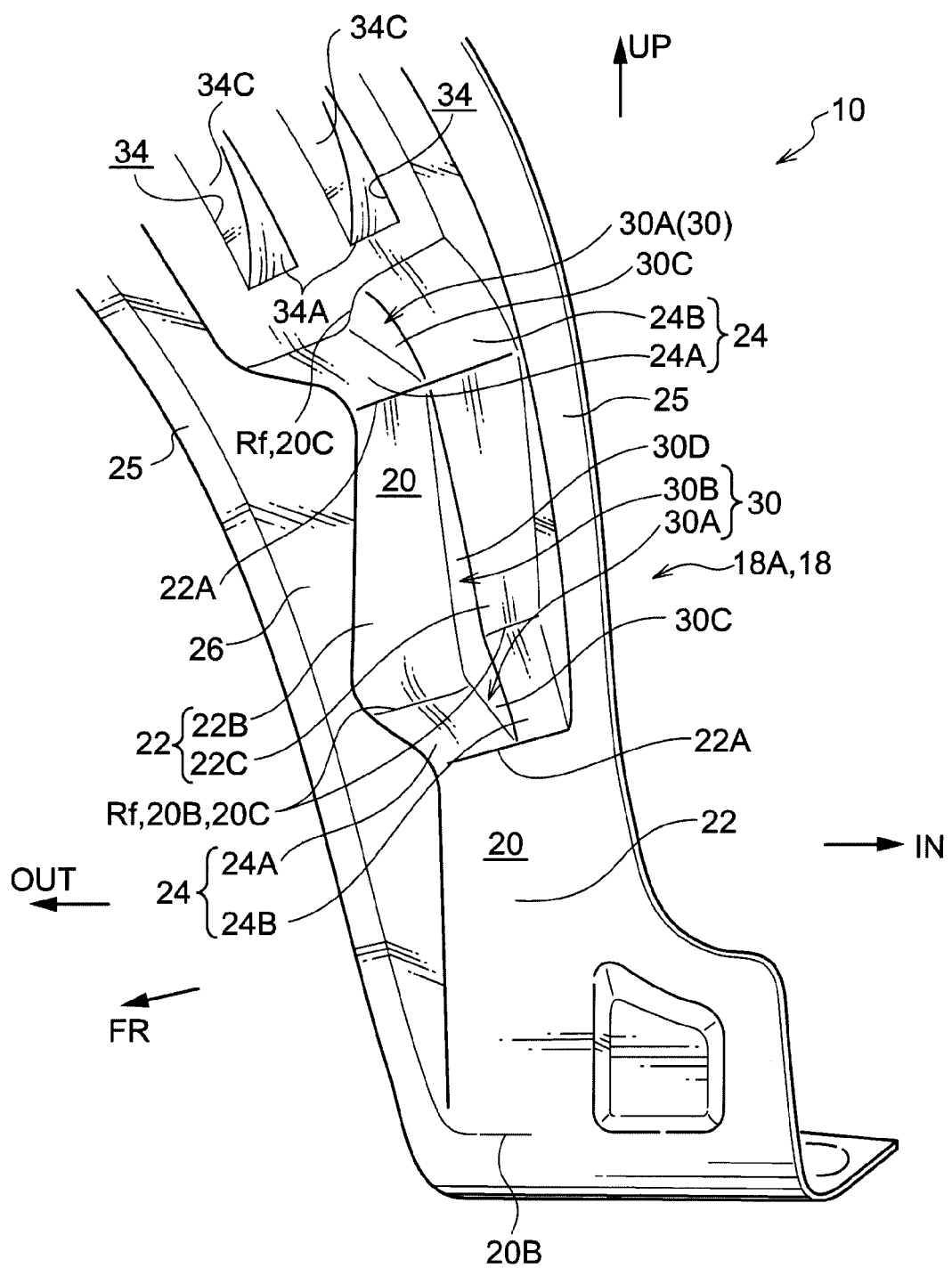
FIG. 1 is a perspective view showing, in an enlarged manner, a portion of an aerodynamic structure for a vehicle relating to a first embodiment of the present invention.

As shown in FIG. 1 and FIG. 2, the concave portion 20 opens toward the front wheel 15 side as described above, and forms a substantially triangular shape as seen in side view whose width along the peripheral direction of the fender liner 18 (the wheel house 14) becomes a maximum at the opening portion 20A. More specifically, the concave portion 20 is structured to have an airflow guiding wall 22, that extends substantially upward from a lower edge 20B of the opening portion 20A, and an airflow collision wall 24, that extends from a rear upper end 22A of the airflow guiding wall 22 toward an upper edge 20C of the opening portion 20A.

The length of the side surface (the length of a side of the triangle) of the airflow collision wall 24 is made to be small with respect to the airflow guiding wall 22. Due thereto, as shown in FIG. 1, the airflow guiding wall 22 extends in a direction substantially along airflow F so as to guide the airflow F (the airflow substantially along a tangent direction of the front wheel 15), that arises accompanying rotation of the front wheel 15 (rotation in the direction of arrow R that is the direction of causing the automobile S to advance forward), to within the concave portion 20. On the other hand, the airflow collision wall 24 extends so as to face the airflow F, and the airflow F that flows-into the concave portion 20 collides therewith.

Due to the above, at the aerodynamic structure 10 for a vehicle, there is a structure in which a portion of the airflow F is blocked by the concave portion 20 and the pressure within the concave portion 20 rises, and accompanying this, the pressure between the opening portion 20A of the concave portion 20 and the front wheel 15 rises. Due to this rise in pressure, at the aerodynamic structure 10 for a vehicle, flowing-in of the airflow F into the wheel house 14 is suppressed.

Further, as shown in FIG. 1 through 3, the plural (two in this embodiment) concave portions 20 are provided at the fender liner 18, so as to be parallel in the peripheral direction of the fender liner 18. In this embodiment, the lower edges 20B, the upper edges 20C of the opening portions 20A of the concave portions 20, that are adjacent in the peripheral direction of the fender liner 18, substantially coincide. Namely, the plural concave portions 20 are formed so as to form indentations and protrusions (wave shapes), that are triangular in sectional view, continuously in the peripheral direction of the fender liner 18. Of the plural concave portions 20, the concave portion 20 that is positioned the furthest rearward and downward is positioned at a rear lower end portion 18A of the fender liner 18.

Further, as shown in FIG. 1 and FIG. 3, the respective concave portions 20 extend along the vehicle width direction, and the vehicle width direction outer ends thereof are sealed by a side wall 26. In this embodiment, the concave portions 20 are formed so as to overlap over the entire width in the vehicle width direction with respect to the front wheel 15 that is positioned at the neutral position (posture). On the other hand, as shown in FIG. 1 and FIG. 3, the vehicle width direction inner ends of the respective concave portions 20 are made to be open ends that are open inwardly in the vehicle width direction. Namely, at the vehicle width direction inner ends, the concave portions 20 are formed as projecting portions with respect to a flange 25 that is formed at the peripheral edge portion of the fender liner 18. Note that, at the vehicle width direction outer end, the flange 25 extends-out toward the vehicle width direction outer side from the front wheel 15 side edge portion of the side wall 26.

Moreover, as shown in FIG. 3, a convex side ridgeline Rf, that is a corner portion between the airflow collision wall 24 that is nearest to the front wheel 15 at the respective concave portions 20, i.e., the fender liner 18, and the airflow guiding wall 22 of the upper side concave portion 20, is structured such that a distance between the convex side ridgeline Rf and a tire envelope Et of the front wheel 15 is greater than or equal to a predetermined value. The distance between the convex side ridgeline Rf and the tire envelope Et is set so as to be equal to a distance between a general wall portion 28 (the general wall portion 28 in the case of supposing that the concave portions 20 are not formed) of the fender liner 18 and the tire envelope Et. Note that the tire envelope Et shows the locus of the most outer side (side near the vehicle body) among the loci of the entire relative displacements with respect to the vehicle body including the steering and bouncing of the front wheel 15.

Further, the aerodynamic structure 10 for a vehicle has step portions 30 that serve as cross-sectional shape sudden change portions that are formed at the concave portions 20. In this embodiment, the step portions 30 have collision wall step portions 30A that are formed such that vehicle width direction inner side portions 24B are positioned at the upper side, in the vehicle body vertical direction, with respect to vehicle width direction outer side portions 24A of the respective airflow collision walls 24. Moreover, the step portion 30 has a guiding wall step portion 30B that is formed such that a vehicle width direction inner side portion 22C is positioned at the rear side, in the vehicle body longitudinal direction, with respect to a vehicle width direction outer side portion 22B of the airflow guiding wall 22 that structures the upper side concave portion 20.

Namely, the step portion 30 is structured such that an inward-facing wall 30C, that faces toward the vehicle width direction inner side, is provided between the vehicle width direction outer side portion 24A and the vehicle width direction inner side portion 24B of each airflow collision wall 24, and such that an inward-facing wall 30D, that faces toward the vehicle width direction inner side, is provided between the vehicle width direction outer side portion 22B and the vehicle width direction inner side portion 22C of the airflow guiding wall 22 that structures the upper side concave portion 20.

Further, at the step portion 30, the height of the inward-facing wall 30C is gradually reduced toward the rear in the vehicle body longitudinal direction, and the height of the inward-facing wall 30D is gradually reduced toward the top in the vehicle body vertical direction, so that the step at the boundary portion (a rear top end 22A of the airflow guiding wall 22) between the airflow collision wall 24 and the airflow guiding wall 22 substantially disappears. Moreover, in this embodiment, the inward-facing wall 30C of the collision wall step portion 30A formed at the lower side concave portion 20, and the inward-facing wall 30D of the guiding wall step portion 30B formed at the upper side concave portion 20, are continuous (made to be common).

Further, as shown in FIG. 1 and FIG. 2, the aerodynamic structure 10 for a vehicle is provided with guide grooves 34 that serve as peripheral direction grooves provided in the fender liner 18 so as to open toward the front wheel 15 side. Portions of the guide grooves 34 that are further toward the vehicle body longitudinal direction front side than the (concave portion 20 that is positioned the most upward and forward of the) concave portions 20 are proximal ends 34A, and the longitudinal directions of the guide grooves 34 are along the peripheral direction of the fender liner 18, and the portions of the guide grooves 34 that are in a vicinity of a front lower end portion 18B of the fender liner 18 are final ends 34B. The guide grooves 34 do not communicate with the concave portions 20.

The groove floors of the guide grooves 34 at the proximal ends 34A and the final ends 34B are respectively tapered, and smoothly continue with the general wall portion 28 (the open surfaces of the concave portions 20 and the guide grooves 34) that forms the general surface of the fender liner 18, and the airflow along the peripheral direction of the concave portions 20 (the wheel house 14) smoothly enters therein and exits therefrom. As shown in FIG. 1, in this embodiment, the plural (two) guide grooves 34 that are parallel in the vehicle width direction are provided. These guide grooves 34 are structured so as to guide the airflow, that is directed from the rear toward the front along the inner periphery of the fender liner 18, so as to make the airflow flow-in from the proximal ends 34A and be discharged from the final ends 34B. In other words, a pair of walls 34C, that face the vehicle width direction at the respective guide grooves 34, are structured so as to prevent airflow directed in the vehicle width direction from arising. Note that the above shows an example in which two of the guide grooves 34 are provided, but merely one guide groove 34 may be provided or three or more may be provided.

Figure 7A:
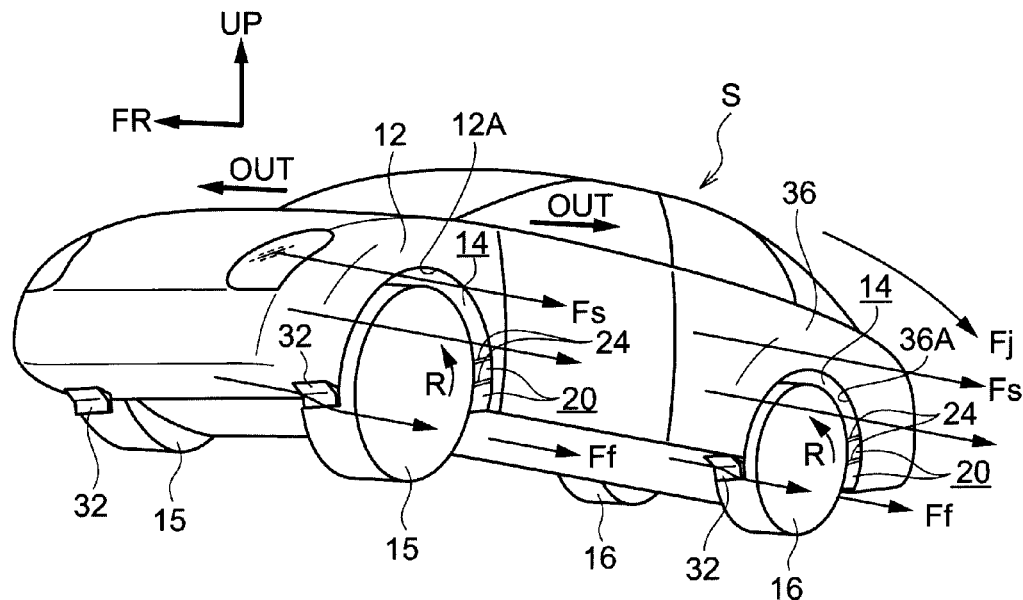
FIG. 7A is a perspective view of an automobile to which the aerodynamic structure for a vehicle relating to the first embodiment of the present invention is applied.

To supplement description of the aerodynamic structure 10 for a vehicle for the rear wheel 16, as shown in FIG. 7A, at the automobile S, the wheel house 14 is formed at the inner side of a wheel arch 36A of a rear fender panel 36, and the rear wheel 16 is disposed within the wheel house 14. The aerodynamic structure 10 for a vehicle for the rear wheel 16 is basically structured similarly to the aerodynamic structure 10 for a vehicle for the front wheel 15, except that the tire envelope Et of the rear wheel 16 that is not the steering wheel (or at which the steering angle is small) is different from the tire envelope Et of the front wheel 15 that is the steering wheel. Namely, the aerodynamic structure 10 for a vehicle for the rear wheel 16 is structured by forming the concave portions 20, the guide grooves 34 at a rear wheel house liner that covers the rear wheel 16 (in the following description, this liner will be called the fender liner 18, without being differentiated from that for the front wheel 15).

Further, as shown in FIG. 2 and FIG. 7A, the aerodynamic structures 10 for a vehicle are provided with spats 32 that extend in the vehicle width direction and are disposed respectively at the front sides of the front wheels 15 and the rear wheels 16. The spats 32 are structured so as to prevent traveling wind, that accompanies traveling of the automobile S, from flowing into the wheel houses 14. The aerodynamic structure 10 for a vehicle may be a structure that is not provided with the spats 32.

Next, operation of the first embodiment will be described.

At the automobile S to which the aerodynamic structure 10 for a vehicle of the above-described structure is applied, when the front wheel 15 rotates in the direction of arrow R accompanying the traveling of the automobile S, the airflow F, that is dragged in by this rotation of the front wheel 15 and flows-in substantially upward into the wheel house 14 from the rear of the front wheel 15, is generated. A portion of this airflow F is guided by the airflow guiding walls 22 and flows-into the concave portions 20, and collides with the airflow collision walls 24. Therefore, a portion of the airflow F is blocked, the pressure within the concave portions 20 rises, and the range of this rise in pressure extends to the space between the concave portions 20 and the front wheel 15. Due thereto, at the aerodynamic structure 10 for a vehicle, the flow-in resistance of air into the wheel house 14 from the rear of the front wheel 15 increases, and the flowing-in of air into that wheel house 14 is suppressed.

Similarly, at the automobile S to which the aerodynamic structure 10 for a vehicle is applied, due to the rise in pressure around the concave portions 20 that arises due to a portion of the airflow being blocked by the airflow collision walls 24 due to rotation of the rear wheel 16, the flow-in resistance of air into the wheel house 14 increases, and the flowing-in of air into that wheel house 14 is suppressed.

Further, another portion of the airflow F passes the setting region of the concave portions 20 and flows into the wheel house 14. At least a portion of the airflow F attempts to flow at the outer peripheral side due to centrifugal force and flows-into the guide grooves 34, and is guided by the guide grooves 34 and discharged from the final end 34B sides.

In this way, in the aerodynamic structure 10 for a vehicle relating to the embodiment, because the concave portions 20 suppress flowing-in of air into the wheel house 14, the airflow F that attempts to flow into the wheel house 14 from beneath the floor of the automobile S is weak, and disturbance of the airflow at the periphery of the wheel house 14 is prevented (is adjusted). Concretely, as shown in FIG. 7A, airflow Ff beneath the floor is prevented from being disturbed, and the smooth airflow Ff is obtained beneath the floor.

Further, the amount of air that flows into the wheel house 14 decreases, and the amount of air that is discharged from the side of the wheel house 14 also decreases. In particular, because the concave portion 20 is disposed at a rear lower edge portion 14A that is the furthest upstream portion where the airflow F flows into the wheel house 14, in other words, because the airflow F is blocked at the furthest upstream portion, the amount of air that is discharged from the side of the wheel house 14 can be decreased further. For these reasons, at the automobile S, airflow Fs along the side surface is prevented from being disturbed, and the smooth airflow Fs is obtained at the side surface.

Due to the above, at the automobile S to which the aerodynamic structure 10 for a vehicle is applied, a reduction in air resistance (the CD value), an improvement in driving stability, a reduction in wind noise, a reduction in splashing (water being scattered-up from the road surface by the front wheel 15, the rear wheel 16), and the like can be aimed for due to the operation of the concave portions 20.

Further, at the aerodynamic structure 10 for a vehicle, because the guide grooves 34 are provided forward of the concave portions 20, the airflows at the inner side and at the side of the wheel house 14 are adjusted. Concretely, because the airflow F within the wheel house 14 flows along (parallel to) the direction of rotation of the front wheel 15, the rear wheel 16 due to the guide grooves 34, disturbance of the airflow within the wheel house 14 (the application of air force to the front wheel 15, the rear wheel 16) is prevented. Further, because discharging of air that has gone via the side of the wheel house 14, i.e., the wheel arch 12A, 36A, is suppressed, the smooth airflow Fs is obtained at the automobile S.

Therefore, at the automobile S to which the aerodynamic structure 10 for a vehicle is applied, a reduction in air resistance, an improvement in the driving stability, a reduction in wind noise, a reduction in splashing, and the like can be aimed for also due to the operation of the guide grooves 34. Accordingly, at the automobile S in which the aerodynamic structures 10 for a vehicle are provided so as to correspond to the front wheels 15, the rear wheels 16 respectively, as shown in FIG. 7A, at both the front portion and the rear portion of the vehicle body, the smooth airflows Ff, Fs that do not have blowing-out that causes disturbance at the side surfaces and beneath the floor are obtained, and these flows merge smoothly at the rear of the vehicle body (refer to arrow Fj).

Figure 7B:
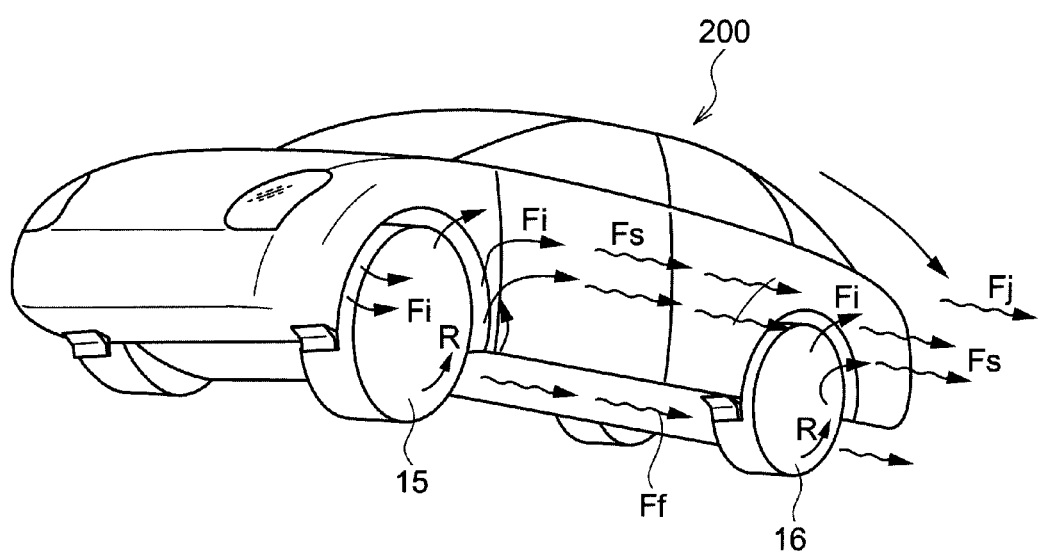
FIG. 7B is a perspective view of an automobile relating to a comparative example with the embodiment of the present invention.

To supplement explanation by comparison with a comparative example shown in FIG. 7B, at a comparative example 200 that is not provided with the aerodynamic structures 10 for a vehicle, the airflows F are generated within the wheel houses 14 accompanying the rotation of the front wheels 15, the rear wheels 16, and this flowing-in causes disturbance of the airflow Ff beneath the floor directly behind the front wheels 15, the rear wheels 16 (the portions where the airflows into the wheel houses 14 are generated). Further, the airflows F that have flowed into the wheel houses 14 go via the wheel arches 12A and are discharged out to the sides of the vehicle body (refer to arrows Fi), and cause disturbance of the airflows Fs. For these reasons, disturbance is caused as well in Fj that merges at the rear of the vehicle body.

In contrast, at the automobile S to which the aerodynamic structures 10 for a vehicle are applied, as described above, the flowing-in of air to the wheel houses 14 from the rear of the front wheels 15, the rear wheels 16 is suppressed by the concave portions 20, and the airflows that have flowed into the wheel houses 14 are adjusted at the guide grooves 34. Therefore, as described above, a reduction in air resistance, an improvement in the driving stability, a reduction in wind noise, a reduction in splashing, and the like can be realized.

In particular, at the aerodynamic structures 10 for a vehicle, because the plural concave portions 20 are provided continuously, the flowing-in of air to the wheel houses 14 from the rear of the front wheels 15, the rear wheels 16 can be suppressed even more effectively. Namely, a sufficient airflow adjusting effect can be obtained by a compact structure that suppresses the amount of projection of the concave portions 20 toward the vehicle body inner portion side. Further, because the guide grooves 34 do not communicate with the concave portions 20, air does not flow from the concave portions 20 to the guide grooves 34 and the pressure of the concave portions 20 does not decrease, and the effect of suppressing the flowing-in of the airflows F to the wheel houses 14 and the effect of adjusting the airflows F that have flowed into the wheel houses 14 can both be established effectively.

Further, at the aerodynamic structures 10 for a vehicle, because the concave portions 20 and the guide grooves 34 are positioned so as to be concave with respect to the general surface 28 of the fender liner 18, interference with the front wheel 15, the rear wheel 16 is not a problem. Accordingly, the concave portions 20, the guide grooves 34 can be designed on the basis of performances required from the standpoint of aerodynamics, without the dimensions and shapes or the arrangement and the like thereof being limited for preventing interference with the front wheel 15, the rear wheel 16.

Figure 5:
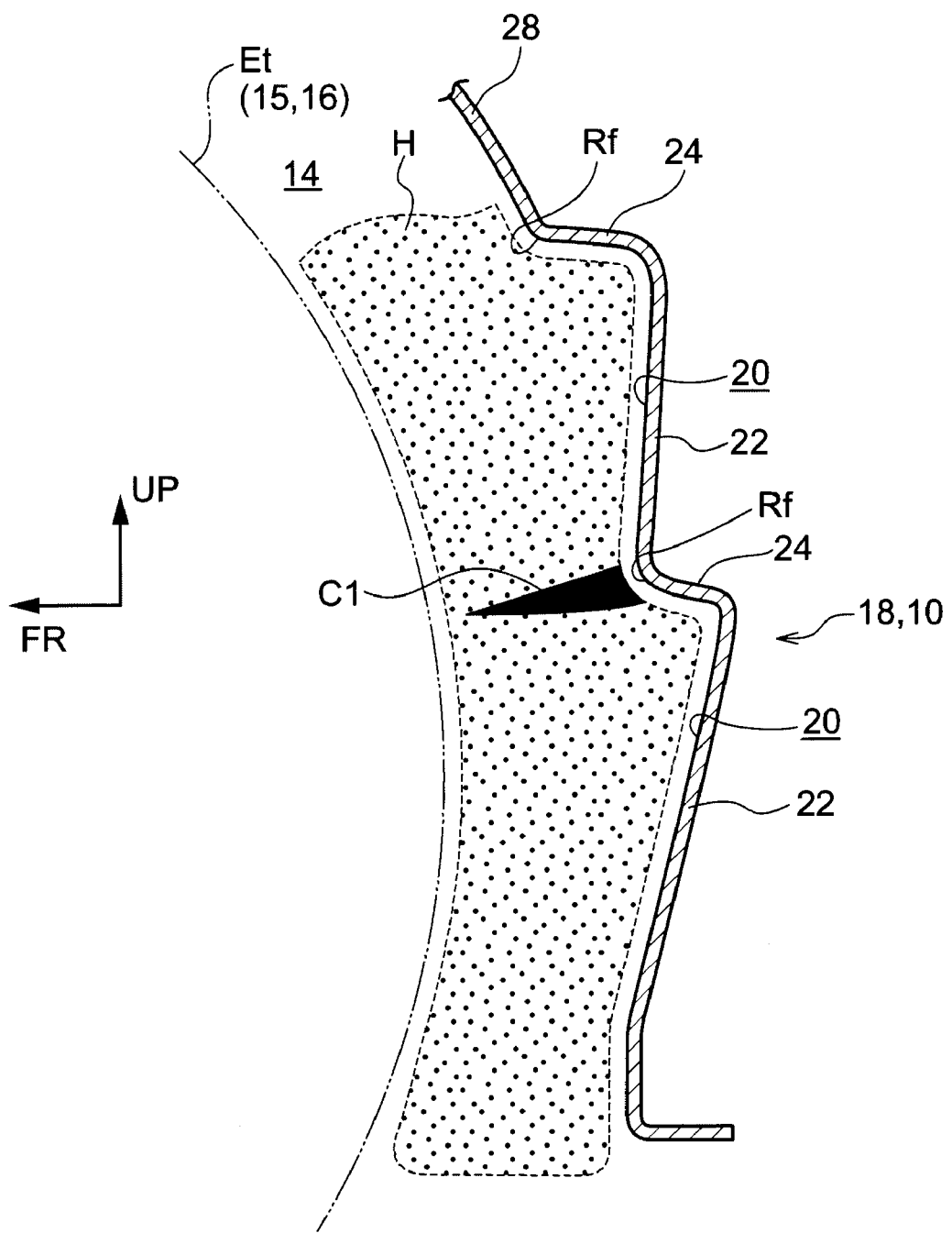
FIG. 5 is a side sectional view schematically showing the adhered state of ice/snow with respect to the aerodynamic structure for a vehicle relating to the first embodiment of the present invention.
Figure 6:
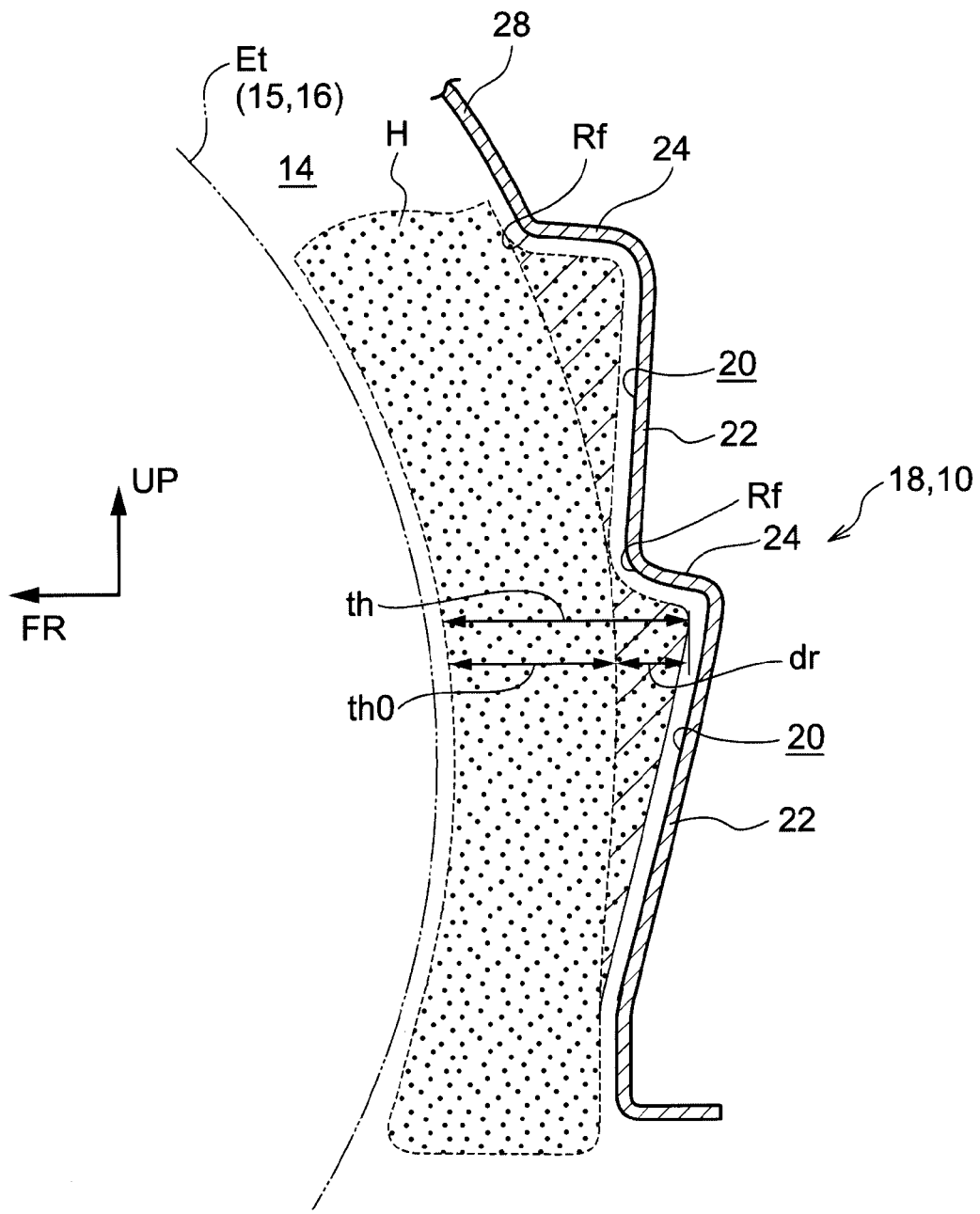
FIG. 6 is a schematic side sectional view for explaining the thickness of ice/snow adhering to the aerodynamic structure for a vehicle relating to the first embodiment of the present invention.

By the way, in the aerodynamic structure 10 for a vehicle, the concave portions 20 are provided at the side that is away from the front wheel 15, the rear wheel 16. Therefore, in a case in which ice/snow H that serves as adhered matter adheres and accumulates (grows) between the wheel house 14, i.e., the fender liner 18, and the front wheel 15, the rear wheel 16 as shown in FIG. 6, it is easy for a thickness th of the ice/snow H to become thick as compared with a structure that does not have the concave portions 20 (a structure in which the convex side ridgeline Rf runs along the vehicle width direction over the entire length as shown by the imaginary line in FIG. 3). Concretely, there are cases in which the thickness th of the ice/snow H becomes thick by an amount substantially corresponding to a depth dr of the concave portion 20 along the vehicle body longitudinal direction, with respect to a thickness th0 in a case that does not have the concave portions 20. Even if the thick ice/snow H that has adhered and accumulated within the wheel house 14 is, for example, destroyed (divided) at a crack C1 that is formed in correspondence with the convex side ridgeline Rf as shown in FIG. 5, it is difficult for the ice/snow H to be discharged immediately from the wheel house 14.

Figure 4:
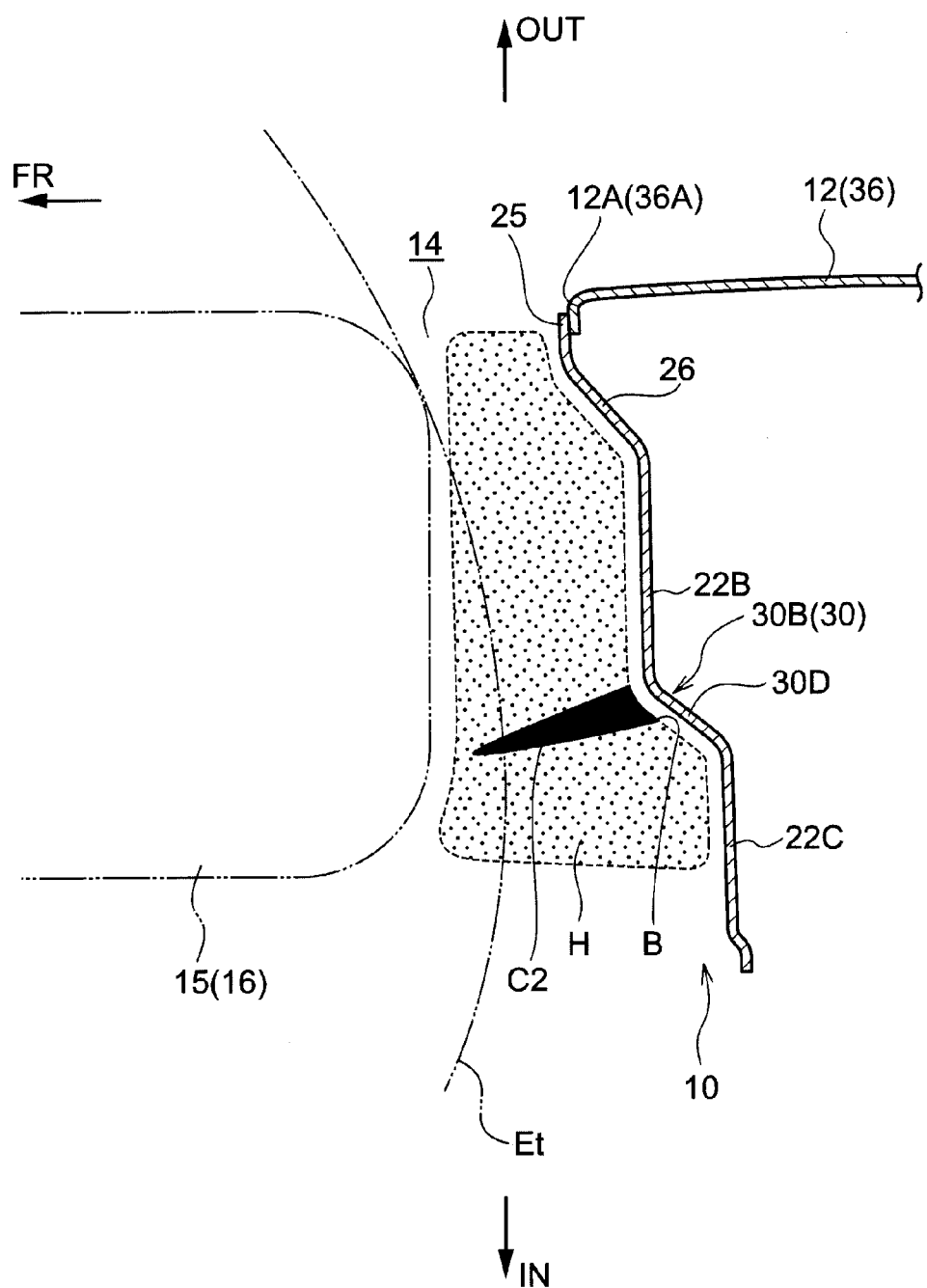
FIG. 4 is a plan sectional view schematically showing an adhered state of ice/snow with respect to the aerodynamic structure for a vehicle relating to the first embodiment of the present invention.

Here, at the aerodynamic device 10 for a vehicle, because the step portions 30 are formed at the concave portions 20, a step portion B is formed so as to follow the step portions 30 (the inward-facing walls 30C) as shown in FIG. 4, in the ice/snow H that has adhered and accumulated within the wheel house 14 between the fender liner 18 (the concave portions 20) and the front wheel 15, the rear wheel 16. Because this step portion B becomes a fragile portion or a stress concentration portion at the ice/snow H, the ice/snow H is easily destroyed (divided) at the step portion B. In particular, because the step portion 30 generates a crack C2 along a direction, i.e., the vehicle body longitudinal direction or the vehicle body vertical direction, that is different from the crack C1 that is generated by the convex side ridgeline Rf and runs along the vehicle width direction, the ice/snow H is easily split vertically and divided left and right (in the vehicle width direction).

Due to the above, because the ice/snow H is divided such that the cross-sectional surface area in plan view becomes small, the ice/snow H is easily discharged (removed) from between the fender liner 18 (the concave portions 20) and the front wheel 15, the rear wheel 16 within the wheel house 14 (discharged in a short time period).

Further, at the aerodynamic structure 10 for a vehicle, at the upper side concave portion 20 at which the discharging path of the ice/snow H is relatively long (the probability of catching on the fender liner 18 or the front wheel 15, 16 is high), the collision wall step portion 30A, the guiding wall step portion 30B are formed at the airflow guiding wall 22, the airflow collision wall 24, respectively, and therefore, the ice/snow H is easily destroyed (divided) more effectively. Namely, at the aerodynamic structure 10 for a vehicle, the ability to discharge the ice/snow H from the wheel house 14 is increased.

Note that the first embodiment shows an example in which the step portions 30 are formed at the airflow collision wall 24 of the lower side concave portion 20 and the airflow guiding wall 22 and the airflow collision wall 24 of the upper side concave portion 20. However, the present invention is not limited to the same, and may be structured such that, for example, the step portion 30 is formed in only any one of the plural airflow guiding walls 22, airflow collision walls 24, or may be structured such that, for example, the step portions 30 are formed only in the respective airflow guiding walls 22 or only in the respective airflow collision walls 24.

Other embodiments of the present invention will be described next. Note that parts/portions that are basically the same as the above-described first embodiment or previously-described structures are denoted by the same reference numerals as the above-described first embodiment or the previously-described structures, and description (illustration) thereof is omitted.

Second Embodiment

Figure 8:
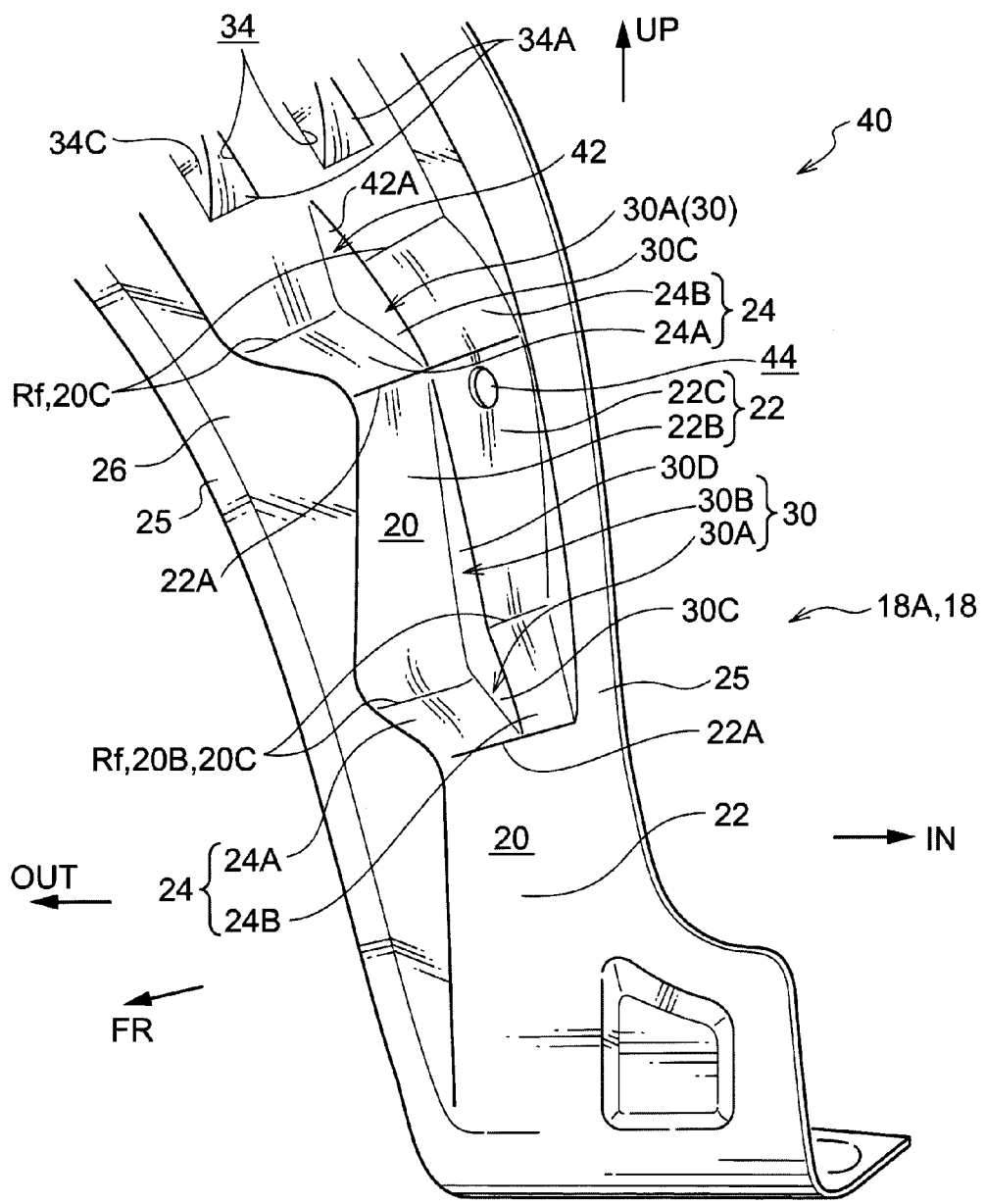
FIG. 8 is a perspective view showing, in an enlarged manner, a portion of an aerodynamic structure for a vehicle relating to a second embodiment of the present invention.

An aerodynamic structure 40 for a vehicle relating to a second embodiment of the present invention is shown in FIG. 8 in a perspective view corresponding to FIG. 1. As shown in this drawing, the aerodynamic structure 40 for a vehicle differs from the aerodynamic structure 10 for a vehicle relating to the first embodiment with regard to the point that a step portion 42, that serves as a cross-sectional shape sudden change portion and is continuous with the step portion 30, is formed at the general wall portion 28 that structures the portion directly above the upper side concave portion 20. Further, the aerodynamic structure 40 for a vehicle differs from the aerodynamic structure 10 for a vehicle relating to the first embodiment with regard to the point that a mounting hole 44 to the vehicle body is formed in the vehicle width direction inner side portion 22C of the airflow guiding wall 22 that structures the upper side concave portion 20.

Figure 9:
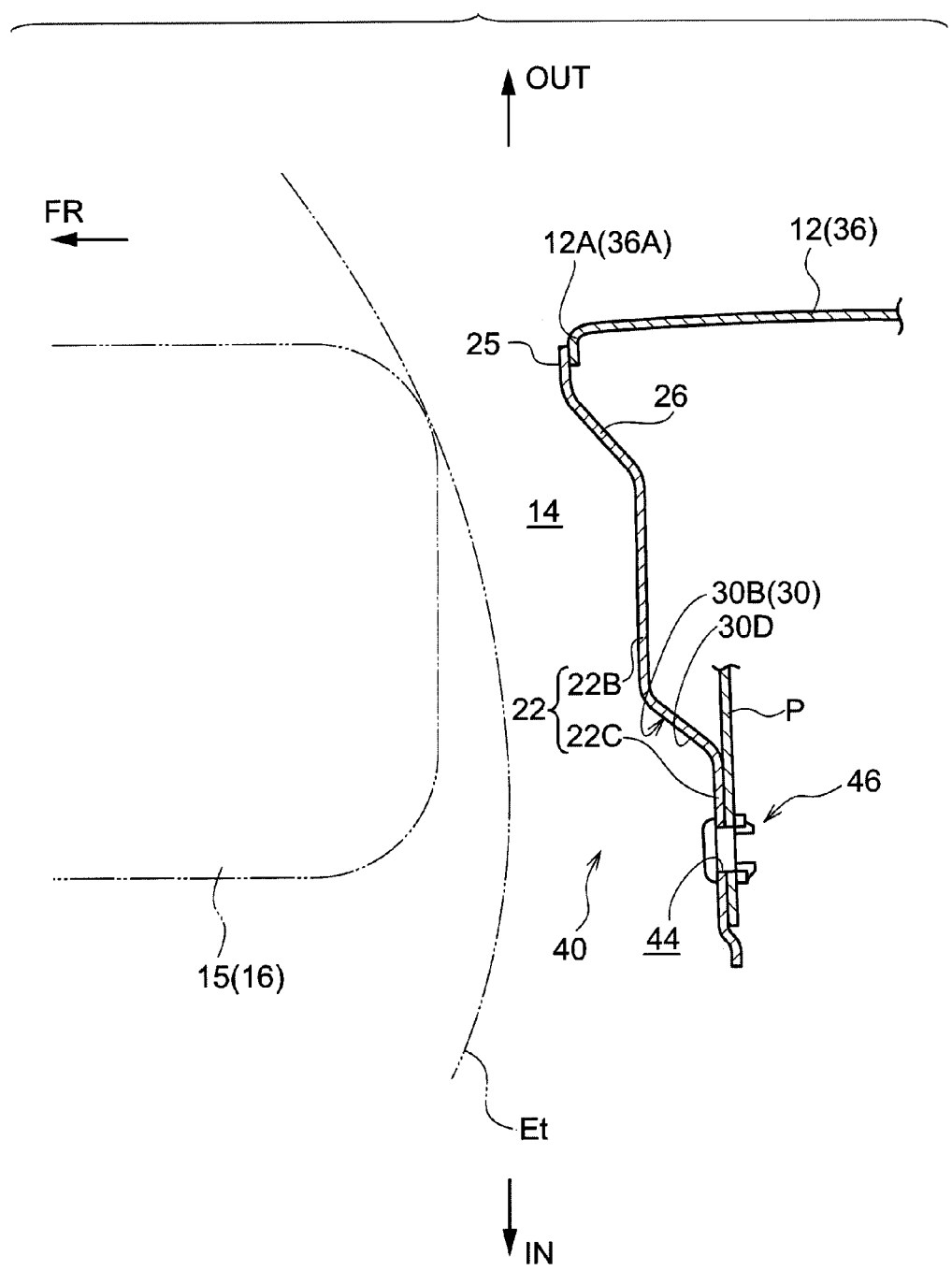
FIG. 9 is a plan sectional view exemplifying a vehicle body mounting structure of the aerodynamic structure for a vehicle relating to the second embodiment of the present invention.

The step portion 42 is structured to have an inward-facing wall 42A that is continuous with the inner-facing wall 30C of the airflow collision wall 24 that structures the upper side concave portion 20, in the same way as the inward-facing wall 30D. Further, at the aerodynamic structure 40 for a vehicle, as shown in FIG. 9, the fender liner 18 is fixed at the mounting hole 44 to a vehicle body panel P that structures the wheel house 14, via an attachment such as a clip 46 or the like for example. The other structures of the aerodynamic structure 40 for a vehicle are the same as the corresponding structures of the aerodynamic structure 10 for a vehicle.

Accordingly, the aerodynamic structure 40 for a vehicle can obtain similar effects by similar operation to the aerodynamic structure 10 for a vehicle. Namely, because flowing-in of air into the wheel house 14 accompanying rotation of the front wheel 15, the rear wheel 16 is suppressed by the concave portions 20, disturbance of the airflow at the periphery of that wheel house 14 is prevented (adjusted). Further, at the aerodynamic structure 40 for a vehicle, the ice/snow H, that has adhered and accumulated within the wheel house 14, is easily destroyed and divided due to the step portions 30. Moreover, at the aerodynamic structure 40 for a vehicle, because the step portion 42 is provided, the ice/snow H is easily destroyed and divided more effectively. Still further, at the aerodynamic structure 40 for a vehicle, the mounting hole 44 is provided at the vehicle width direction inner side portion 22C that is positioned away from the front wheel 15, the rear wheel 16 at the airflow guiding wall 22, and the mounting hole can be used as a mounting seat surface for fixing the vehicle width direction inner side portion 22C to the vehicle body panel P.

Note that the aerodynamic structure 40 for a vehicle relating to the second embodiment may be structured such that, for example, the step portion 42 is not formed, or may be structured so as to, for example, not have the mounting hole 44.

Third Embodiment

Figure 10:
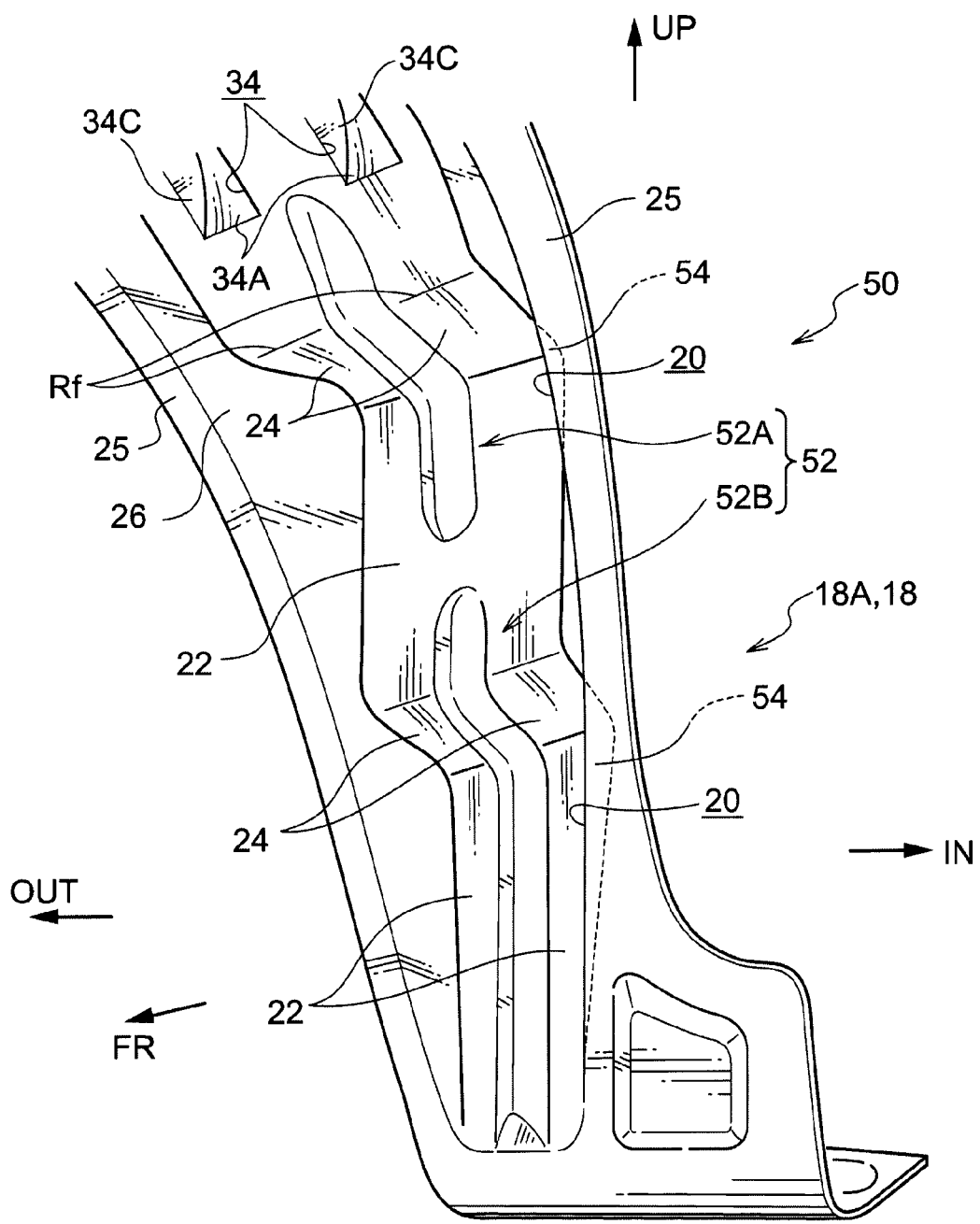
FIG. 10 is a perspective view showing, in an enlarged manner, a portion of an aerodynamic structure for a vehicle relating to a third embodiment of the present invention.

An aerodynamic structure 50 for a vehicle relating to a third embodiment of the present invention is shown in FIG. 10 in a perspective view corresponding to FIG. 1. As shown in this drawing, the aerodynamic structure 50 for a vehicle differs from the aerodynamic structure 10 for a vehicle relating to the first embodiment with regard to the point that a bead 52, that is a convex portion serving as a cross-sectional shape sudden change portion, is formed instead of the step portions 30.

Figure 11:
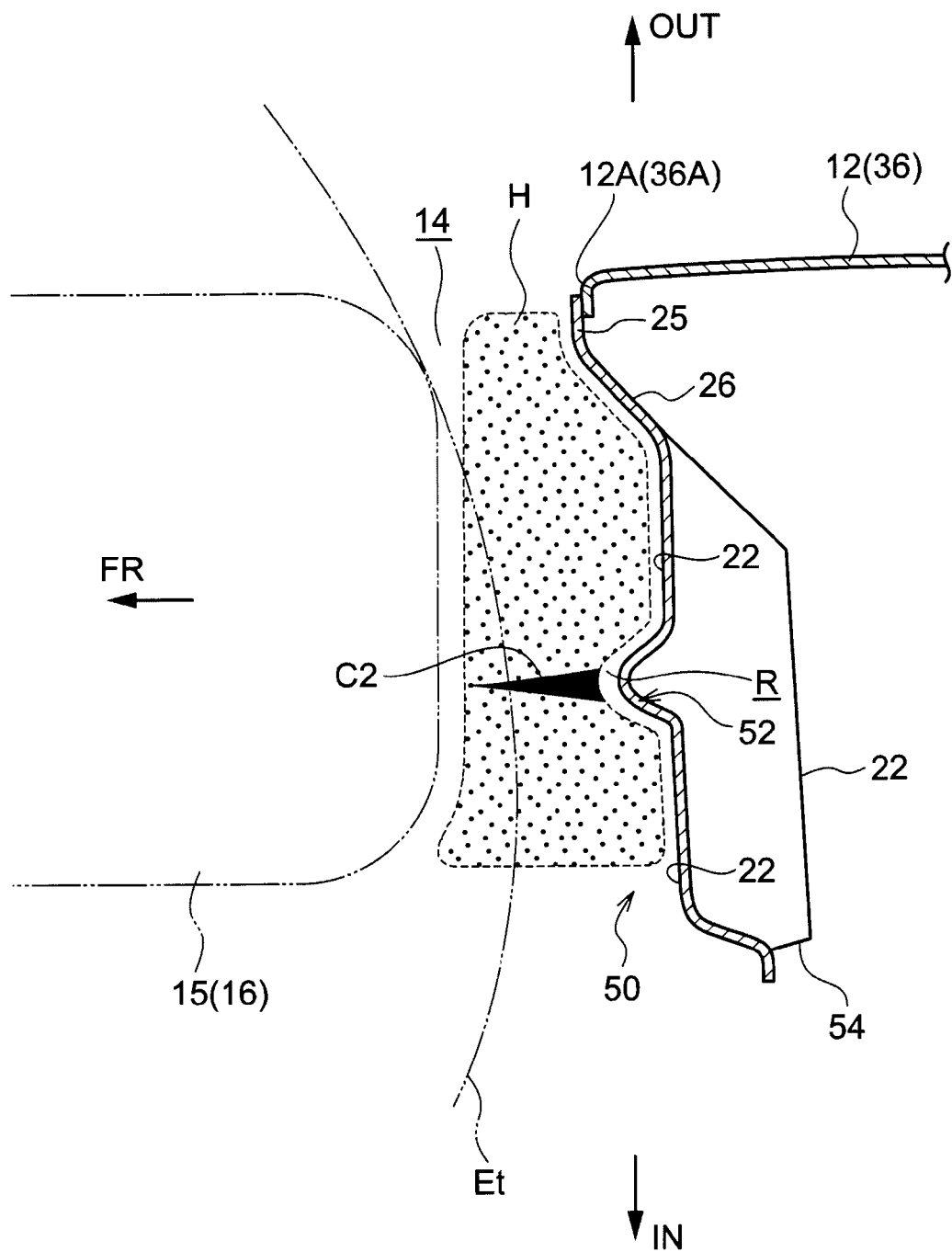
FIG. 11 is a plan sectional view schematically showing an adhered state of ice/snow with respect to the aerodynamic structure for a vehicle relating to the third embodiment of the present invention.

As shown in FIG. 11 as well, the bead 52 can be understood as being a convex portion that projects-out toward the front wheel 15, the rear wheel 16 mainly from the central portion of the concave portions 20. In this embodiment, the bead 52 is made to be long in the peripheral direction of the fender liner 18.

More concretely, the bead 52 is structured so as to have a lower side bead 52A, that is spread over the airflow guiding wall 22, the airflow collision wall 24 of the lower side concave portion 20 and to the lower portion of the airflow guiding wall 22 of the upper side concave portion 20, and an upper side bead 52B, that is spread over the upper portion of the airflow guiding wall 22, the airflow collision wall 24 of the upper side concave portion 20 and to the lower portion of the general wall portion 28. At both vehicle width direction sides that sandwich the bead 52, the positions of the airflow guiding walls 22 in the vehicle body longitudinal direction, the positions of the airflow collision walls 24 in the vehicle body vertical direction substantially coincide.

FIG. 10 shows an example in which the lower side bead 52A and the upper side bead 52B are separated (are formed independently), but the lower side bead 52A and the upper side bead 52B may be provided continuously. Further, the bead 52 may be formed by intermittently providing shorter convex portions.

Further, at the aerodynamic structure 50 for a vehicle, portions at the floor sides of the vehicle width direction inner ends of the respective concave portions 20 (the rear end sides in the vehicle body longitudinal direction of the airflow collision walls 24) are closed in the vehicle width direction by an inner side wall 54 that faces the side wall 26. The other structures of the aerodynamic structure 50 for a vehicle are the same as the corresponding structures of the aerodynamic structure 10 for a vehicle.

Accordingly, the aerodynamic structure 50 for a vehicle can obtain similar effects by similar operation to the aerodynamic structure 10 for a vehicle. Namely, because flowing-in of air into the wheel house 14 accompanying rotation of the front wheel 15, the rear wheel 16 is suppressed by the concave portions 20, disturbance of the airflow at the periphery of that wheel house 14 is prevented (adjusted). In particular, because the inner side wall 54 is provided, it is easy for the pressure around the concave portions 20 to be maintained high, and the airflow adjusting effect within the wheel house 14 is good. Further, at the aerodynamic structure 50 for a vehicle, because the bead 52 is provided at the concave portions 20, a concave portion R is formed so as to follow the bead 52 as shown in Fig.11 in the ice/snow H that has adhered and accumulated within the wheel house 14 between the fender liner 18 (the concave portions 20) and the front wheel 15, the rear wheel 16. Because this concave portion R becomes a fragile portion or a stress concentration portion at the ice/snow H, the ice/snow H is easily destroyed (divided) at the concave portion R. In particular, because the bead 52 generates the crack C2 in a direction, i.e., the vehicle body longitudinal direction or the vehicle body vertical direction, that is different from the crack C1 that is generated by the convex side ridgeline Rf and runs along the vehicle width direction, the ice/snow H is easily split vertically and divided left and right (in the vehicle width direction).

Due to the above, because the ice/snow H is divided such that the cross-sectional surface area in plan view becomes small, the ice/snow H is easily discharged (removed) from between the fender liner 18 (the concave portions 20) and the front wheel 15, the rear wheel 16 within the wheel house 14 (discharged in a short time period).

Further, at the aerodynamic structure 50 for a vehicle, at the respective concave portions 20 including the upper side concave portion 20 at which the discharging path of the ice/snow H is relatively long (the probability of catching on the fender liner 18 or the front wheel 15, 16 is high), the collision wall step portion 30A, the guiding wall step portion 30B are formed at the airflow guiding wall 22, the airflow collision wall 24, respectively, and therefore, the ice/snow H is easily destroyed (divided) more effectively. Namely, at the aerodynamic structure 50 for a vehicle, the ability to discharge the ice/snow H from the wheel house 14 is increased.

Note that the aerodynamic structure 50 for a vehicle relating to the third embodiment may be structured such that, for example, the step portions 30 (and the step portion 42) are formed instead of the bead 52, or may be structured so as to not have the inner side wall 54 in a structure in which the bead 52 is formed.

Fourth Embodiment

Figure 12:
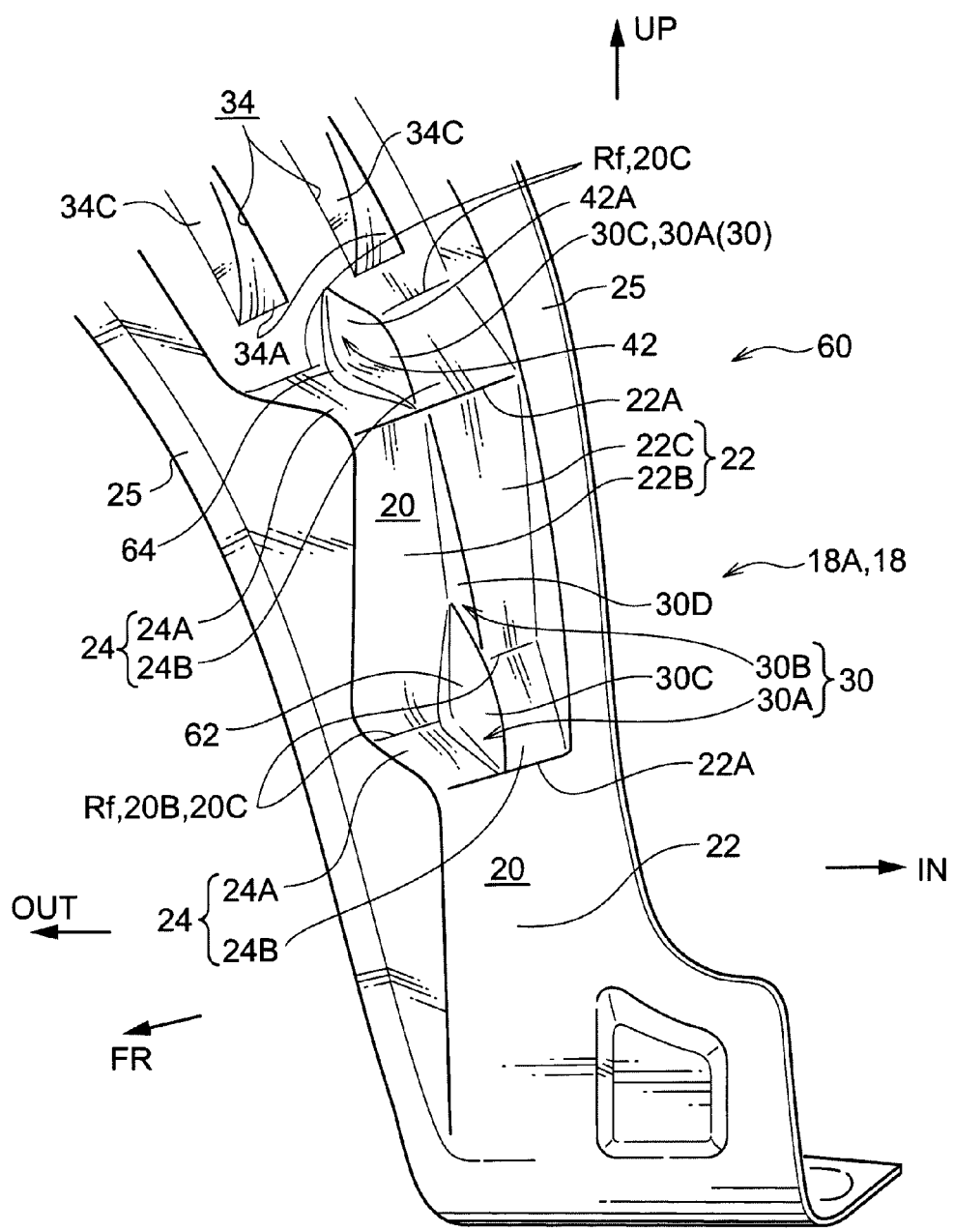
FIG. 12 is a perspective view showing, in an enlarged manner, a portion of an aerodynamic structure for a vehicle relating to a fourth embodiment of the present invention.

An aerodynamic structure 60 for a vehicle relating to a fourth embodiment of the present invention is shown in FIG. 12 in a perspective view corresponding to FIG. 1. As shown in this drawing, the aerodynamic structure 60 for a vehicle differs from the aerodynamic structure 10 for a vehicle relating to the first embodiment with regard to the point that beads 62, 64 are combined with the step portions 30, 42.

Figure 13:
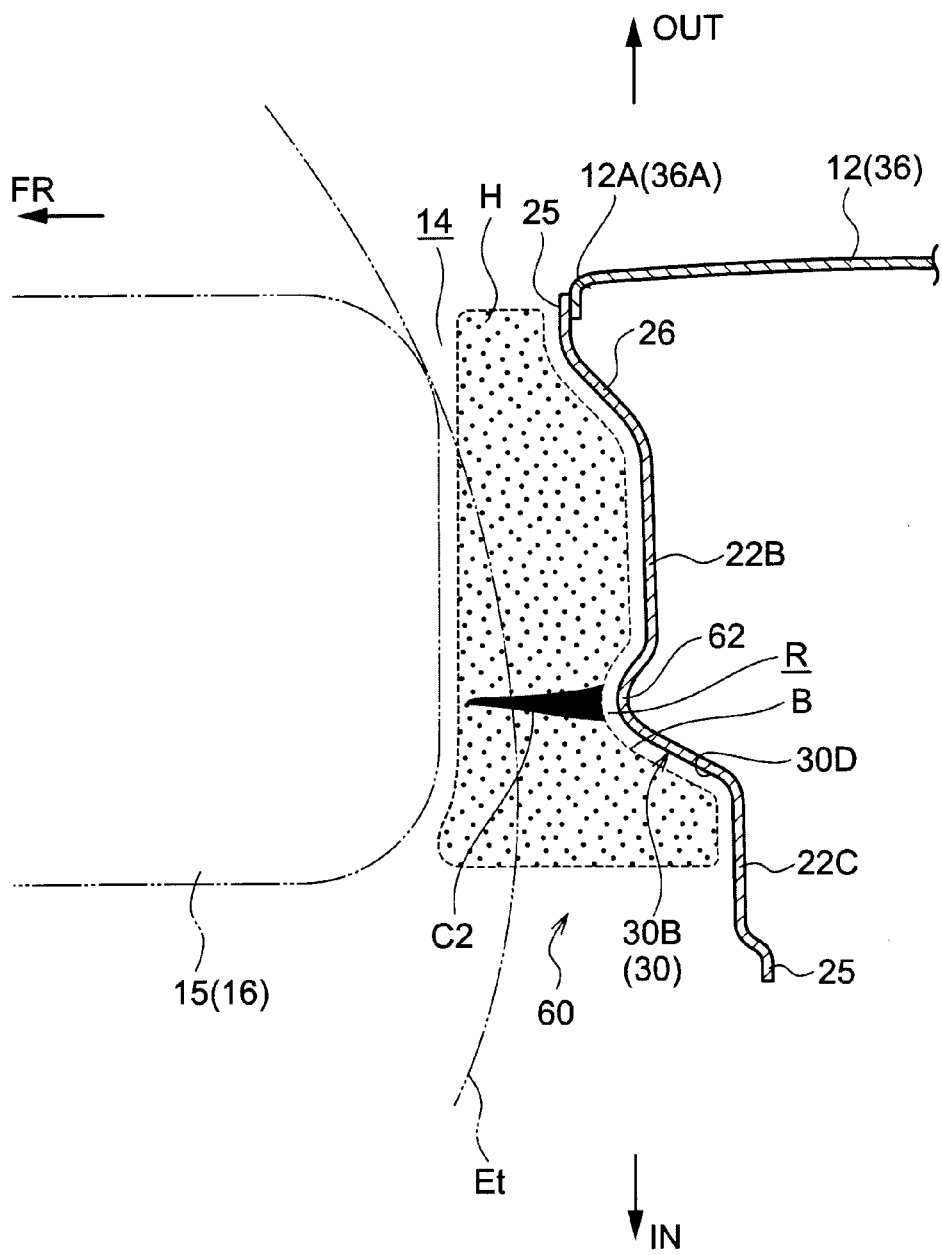
FIG. 13 is a plan sectional view schematically showing an adhered state of ice/snow with respect to the aerodynamic structure for a vehicle relating to the fourth embodiment of the present invention.

The bead 62 is formed so as to project-out toward the front wheel 15, the rear wheel 16 side from a corner portion of the inward-facing wall 30C of the airflow collision wall 24 that structures the lower side concave portion 20 and the inward-facing wall 30D of the airflow guiding wall 22 that structures the upper side concave portion 20. Namely, at the aerodynamic structure 60 for a vehicle, the projecting heights of the inward-facing wall 30C, the inward-facing wall 30D can be understood as being increased by the bead 62. The bead 64 is formed so as to project-out toward the front wheel 15, the rear wheel 16 side from a corner portion of the inward-facing wall 30C of the airflow collision wall 24 that structures the upper side concave portion 20 and the inward-facing wall 42A of the step portion 42. Namely, as shown in FIG. 13 as well, at the aerodynamic structure 60 for a vehicle, the projecting heights of the inward-facing wall 30C, the inward-facing wall 42A can be understood as being increased by the bead 24. The other structures of the aerodynamic structure 60 for a vehicle are the same as corresponding structures of the aerodynamic structure 10 for a vehicle.

Accordingly, the aerodynamic structure 60 for a vehicle can obtain similar effects by similar operation to the aerodynamic structure 10 for a vehicle. Namely, because flowing-in of air into the wheel house 14 accompanying rotation of the front wheel 15, the rear wheel 16 is suppressed by the concave portions 20, disturbance of the airflow at the periphery of that wheel house 14 is prevented (adjusted).

Further, at the aerodynamic structure 60 for a vehicle, the ice/snow H that has adhered and accumulated within the wheel house 14 is easily destroyed and divided by the step portions 30, 42. Moreover, at the aerodynamic structure 60 for a vehicle, the concave portion R, that is continuous with a portion of the formed portion of the step portion B at the ice/snow H that has adhered and accumulated within the wheel house 14, is formed by the beads 62, 64. Namely, a portion that is more fragile (at which it is easier for stress to concentrate) than the step portion B is generated at the ice/snow H, and the ice/snow H that has adhered and accumulated within the wheel house 14 is easily destroyed and divided. The beads 62, 64 can be understood as being cross-sectional shape sudden change portions that are independent from the step portions 30, 42, and can be understood as structuring cross-sectional shape sudden change portions in combination with the step portions 30, 42.

Note that the above-described embodiments show examples in which two of the concave portions 20 are provided at the fender liner 18, but the present invention is not limited to the same and can be structured, for example, to have one or three or more concave portions 20 in accordance with the required aerodynamic performances and the like. Further, the present invention is not limited to a structure in which the concave portions 20 and the cross-sectional shape sudden change portions (the step portions 30, 42, the beads 52, 62, and the like) are provided at the fender liner 18. For example, in a structure that is equipped with a mud guard, the concave portions 20 and cross-sectional shape sudden change portions may be formed at the mud guard, or, for example, the concave portions 20 and cross-sectional shape sudden change portions may be formed at the vehicle body panel P.

Moreover, the above-described embodiment shows an example in which the aerodynamic structure 10 for a vehicle has the guide grooves 34, but the present invention is not limited to the same and may be, for example, a structure that does not have the guide grooves 34. Still further, the above-described embodiments show examples in which the concave portions 20 are disposed at the rear lower edge portion 14A of the wheel house 14, but the present invention is not limited to the same. For example, the concave portions 20 may be disposed at any portion at the rear side, in the vehicle body longitudinal direction, with respect to the rotation axis RC of the front wheel 15, the rear wheel 16.

Figure 14:
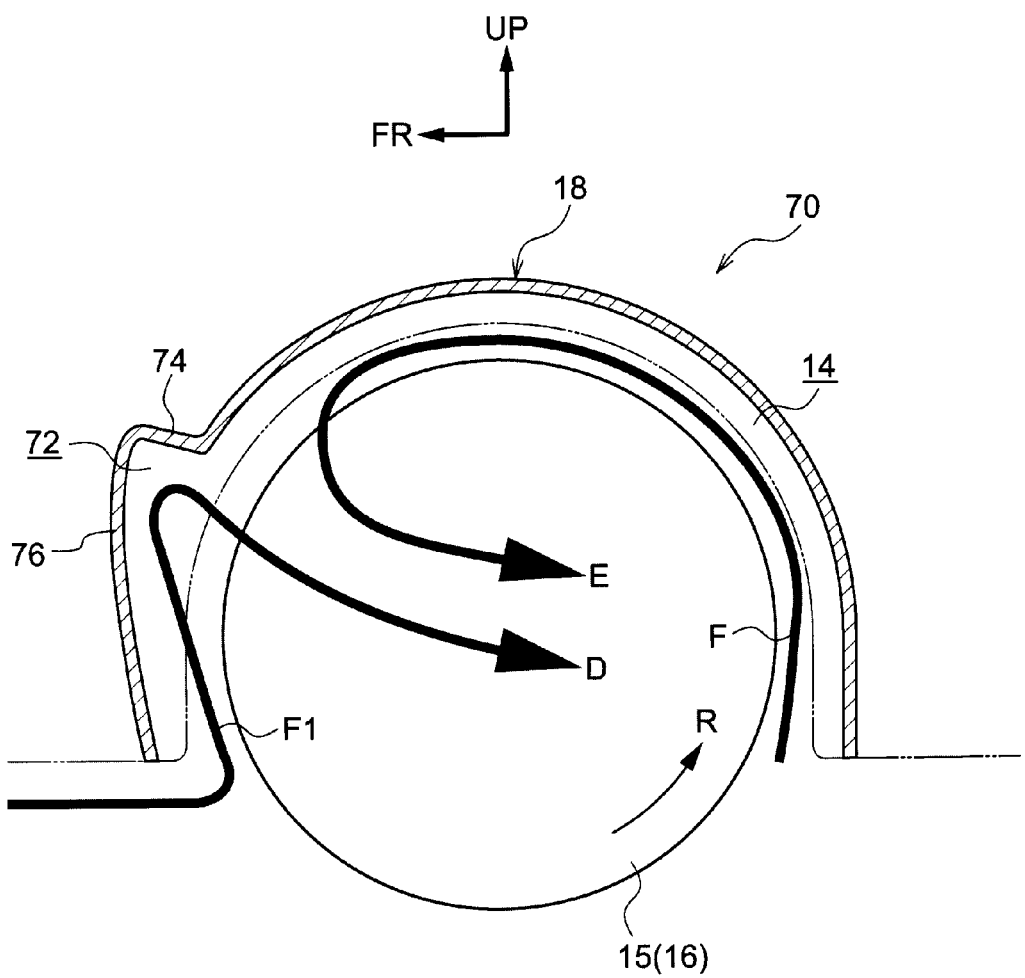
FIG. 14 is a side sectional view schematically showing the schematic overall structure of an aerodynamic structure for a vehicle relating to another example of an embodiment of the present invention.

Further, the above-described embodiments show examples in which the present invention is applied to the aerodynamic structure 10, 40, 50, 60 for a vehicle in which the concave portions 20, that are for suppressing airflow F that is directed forward within the wheel house 14 accompanying the rotation of the front wheel 15 or the like, are formed at the rear side in the vehicle body longitudinal direction with respect to the rotation axis RC of the front wheel 15, the rear wheel 16. However, the present invention is not limited to the same. For example, as shown in FIG. 14, the present invention may be applied to an aerodynamic structure 70 for a vehicle in which a concave portion 72 is formed at the front side in the vehicle body longitudinal direction with respect to the rotational axis RC of the front wheel 15 or the like. To supplement description of the concave portion 72, the concave portion 72 has an airflow collision wall 74 that faces toward the lower side in the vehicle body vertical direction, and an airflow guiding wall 76 that hangs downwardly in the vehicle body vertical direction from the front edge in the vehicle body longitudinal direction of the airflow collision wall 74. In an automobile to which the aerodynamic structure 70 for a vehicle is applied, traveling wind hits the front surface of the front wheel 15 or the like, and airflow F1, that is directed from the front side toward the rear side of the front wheel 15 or the like within the wheel house 14, is generated, and, on the other hand, the airflow F, that accompanies rotation of the front wheel 15 or the like in the direction of arrow R, arises. A portion of the airflow F1 is guided by the airflow guiding wall 76 and flows-into the concave portion 72 and collides with the airflow collision wall 74, and therefore, a portion of the airflow F1 is blocked and the pressure within the concave portion 72 rises. Due thereto, at the aerodynamic structure 70 for a vehicle, the airflow F1, that cannot pass through the aforementioned portion where the pressure rises, is discharged from the wheel house 14 so as to flow at the side of the front wheel 15 or the like as shown by arrow D. On the other hand, when the airflow F reaches the portion where the pressure rises that is generated by the airflow F1 colliding with the airflow collision wall 74, the airflow F is discharged from the wheel house 14 so as to flow at the side of the front wheel 15 or the like as shown by arrow E. In this way, the power of both of the airflows F1, F are weakened and the airflows F1, F interfere due to the portion where the pressure rises that is generated by the airflow F1 colliding with the airflow collision wall 74, and the airflows F1, F are thereby smoothly discharged from the side of the front wheel 15 or the like. Namely, due to the aerodynamic structure 70 for a vehicle as well, the airflows at the inner side and at the side of the wheel house 14 are adjusted. By providing at least some of the step portions 30, 42, the beads 52, 62 at the above-described concave portion 72, the ice/snow H that has adhered and accumulated at the front side of the front wheel 15 or the like is easily discharged. The aerodynamic structure 70 for a vehicle also not being limited by the number of the concave portions 72 and the like is similar to the aerodynamic structures 10, 40, 50, 60 for a vehicle. A11

Further, at the aerodynamic structure 60 for a vehicle, the ice/snow H that has adhered and accumulated within the wheel house 14 is easily destroyed and A11, divided by the step portions 30, 42. Moreover, at the aerodynamic structure 60 for a vehicle, the concave portion R, that is continuous with a portion of the formed portion of the step portion B at the ice/snow H that has adhered and accumulated within the wheel house 14, is formed by the beads 62, 64. Namely, a portion that is more fragile (at which it is easier for stress to concentrate) than the step portion B is generated at the ice/snow H, and the ice/snow H that has adhered and accumulated within the wheel house 14 is easily destroyed and divided. The beads 62, 64 can be understood as being cross-sectional shape sudden change portions that are independent from the step portions 30, 42, and can be understood as structuring cross-sectional shape sudden change portions in combination with the step portions 30, 42.

The invention claimed is:

1. An aerodynamic structure for a vehicle, comprising:
   an airflow collision wall provided at a front or a rear in a vehicle body longitudinal direction with respect to a wheel in a wheel house, the airflow collision wall extending in a vehicle width direction and facing downward in a vehicle body vertical direction;
   an airflow guiding wall extending downward in the vehicle body vertical direction from an end portion of the airflow collision wall, wherein the airflow collision wall has a first side and a second side, the first side being farther than the second side away from the wheel in the vehicle body longitudinal direction, and wherein the end portion is at the first side of the airflow collision wall; and
   a cross-sectional shape sudden change portion formed in the vehicle width direction at a portion of at least one of the airflow collision wall and the airflow guiding wall, and including a part that extends along a direction intersecting the vehicle width direction.

2. The aerodynamic structure for a vehicle of claim 1, wherein the cross-sectional shape sudden change portion is formed at a central portion, in the vehicle width direction, of at least one of the airflow collision wall and the airflow guiding wall.

3. The aerodynamic structure for a vehicle of claim 1, wherein the cross-sectional shape sudden change portion is structured to include a step portion that is formed in at least one of the airflow collision wall and the airflow guiding wall and at which positions, in the vehicle body longitudinal direction or the vehicle body vertical direction, one end side and another end side of the step portion in the vehicle width direction are different.

4. The aerodynamic structure for a vehicle of claim 1, wherein the cross-sectional shape sudden change portion is structured to include a convex portion that is formed at at least one of the airflow collision wall and the airflow guiding wall and that projects toward the wheel side.

5. The aerodynamic structure for a vehicle of claim 1, wherein a width of the cross-sectional shape sudden change portion varies in at least one of the vehicle body longitudinal direction or the vehicle body vertical direction.

6. The aerodynamic structure for a vehicle of claim 1, wherein the cross-sectional shape sudden change portion includes a collision wall step portion and a guiding wall step portion, the guiding wall step portion gradually decreasing in width towards the top in the vehicle body vertical direction and the collision wall step portion gradually decreasing in width towards a rear of the vehicle body longitudinal axis.

7. The aerodynamic structure for a vehicle of claim 6, wherein the guiding wall step portion gradually decreases in width toward the end portion.

8. The aerodynamic structure for a vehicle of claim 1, further comprising a convex portion located between the airflow collision wall and the airflow guiding wall, the convex portion facing toward the wheel.

9. The aerodynamic structure for a vehicle of claim 1, further comprising guide grooves located above the airflow collision wall in the vehicle body vertical direction.

10. The aerodynamic structure for a vehicle of claim 1, wherein the cross-section shape sudden change portion is disposed in the vehicle width direction at a portion of the airflow collision wall and the airflow guiding wall.

11. The aerodynamic structure for a vehicle of claim 1, wherein the cross-section shape sudden change portion is disposed at a central portion, in the vehicle width direction, of the airflow collision wall and the airflow guiding wall.

* * * * *